May 9, 1939.  H. J. WOLLWEBER  2,157,515
METHOD OF TREATING ANIMAL CASINGS
Filed June 17, 1936  2 Sheets-Sheet 1
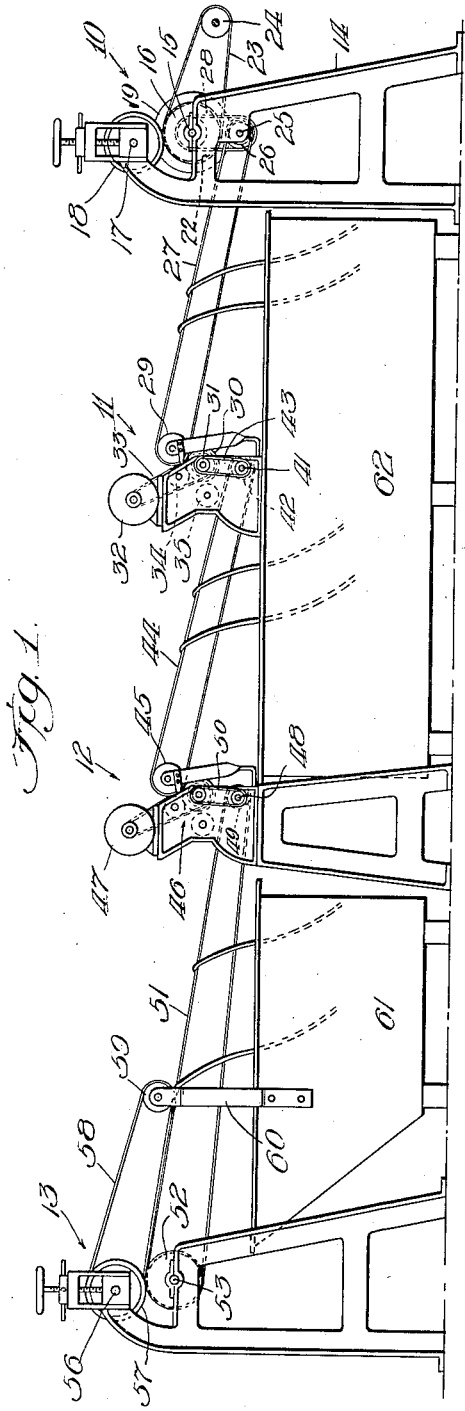
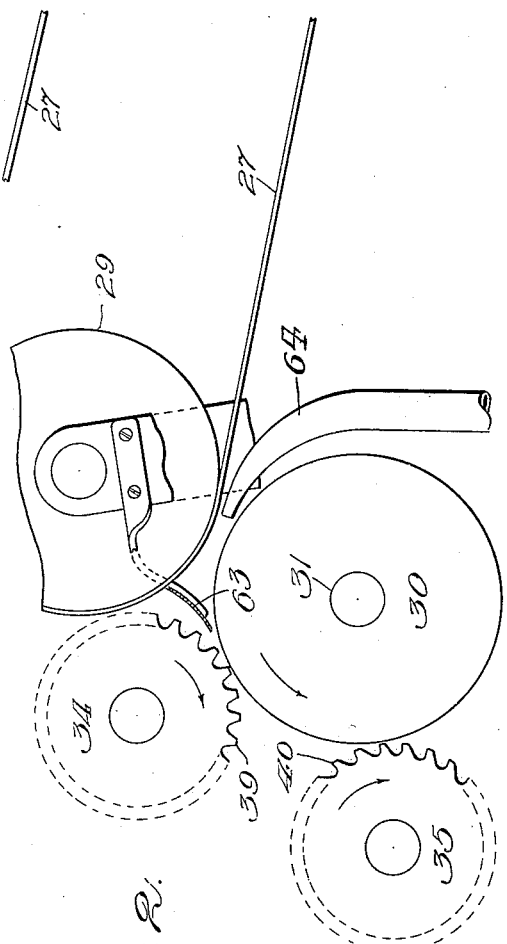
Inventor:
Henry J. Wollweber.
by Davis, Lindsey, Smith & Shonts
Attys.

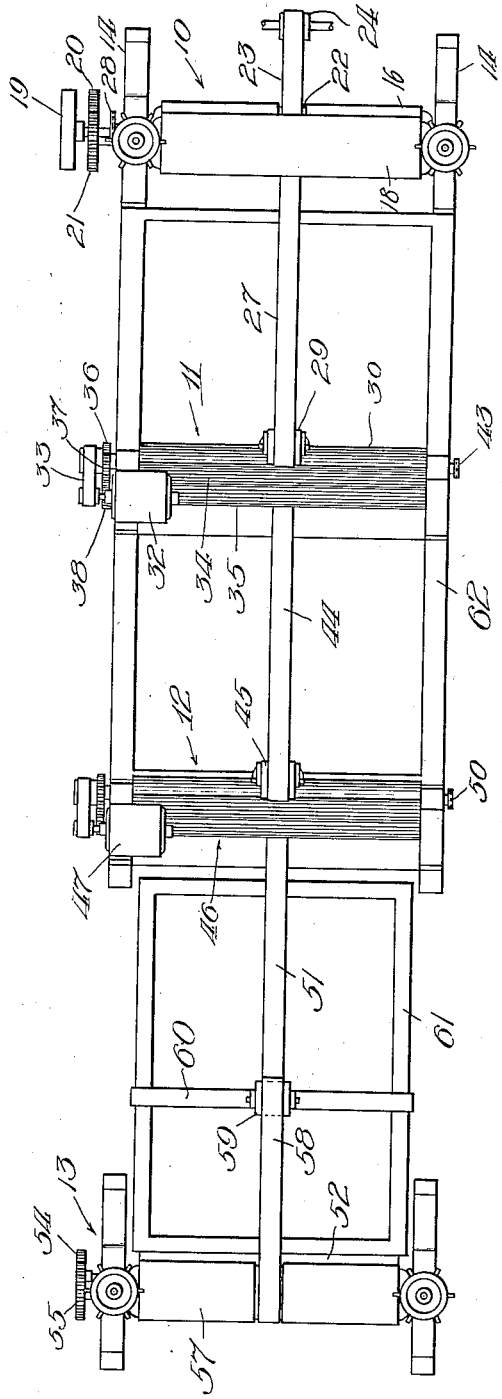

Patented May 9, 1939

2,157,515

UNITED STATES PATENT OFFICE 2,157,515

METHOD OF TREATING ANIMAL CASINGS

Henry J. Wollweber, Chicago, Ill., assignor, by mesne assignments, to Oppenheimer Casing Co., Chicago, Ill., a corporation of Delaware Application June 17, 1936, Serial No. 85,690

6 Claims. (Cl. 17—43)

My invention relates to a method of treating animal casings by loosening the outer skin or slice, mucus, fat and slime, and removing certain of these materials, preliminary to the final conditioning of the casing for sausages, bolognas, and the like.

The principal object of my invention is the subjecting of the casing to a continuous treatment which produces more effective results than are now obtained in the industry with respect to the ease and thoroughness of removing extraneous matter and therefore with less probability of rupturing the delicate tissues of the casing.

A further object is the provision of a method in which the casings are crushed substantially throughout their length, thus insuring a thorough loosening of the undesirable matter.

These and further objects of my invention will be set forth in the following specification, reference being had to the accompanying drawings, and the novel means by which said objects are effectuated will be definitely pointed out in the claims.

In the drawings:

Figure 1 is a side elevation of my improved apparatus, showing the relation of the several machine units employed in the working of the method.

Fig. 2 is an enlarged, end elevation showing the relation of the component rolls of each crushing machine.

Fig. 3 is a plan view of the apparatus illustrated in Fig. 1.

Referring to the drawings, the numerals 10, 11, 12 and 13 represent generally a first stripping machine, a first crushing machine, a second crushing machine, and a second stripping machine, respectively, the sequence of the numbers indicating the order of operation of the several machine units on the animal casings while being subjected to the treatment method.

The stripping machine 10 comprises a pair of spaced standards 14 between which is bridged and journaled a shaft 15 to which a squeezing roll 16 is secured. A second shaft 17 is also journaled in the standards 14 in a position generally above the shaft 14 and fixed to the shaft 17 is a second squeezing roll 18 whose surface is in cooperating squeezing relation to the surface of the roll 16. The shaft 15 extends beyond one of the standards 14, as indicated in Fig. 3, and affixed thereto is a pulley 19 which may be appropriately driven by any source of power. Driving relation between the shafts 15 and 17 is established through the medium of meshing gears 20 and 21 that are fast to shafts 15 and 17, respectively.

A shallow, annular channel 22 is cut into the surface of the roll 16 at the middle portion thereof and operating in this channel is a belt 23 which also passes around an idler pulley 24 which may be appropriately supported on the frame. The surface of the belt 23 does not project outwardly of the surface of the roll 16 and this belt is employed as a feeding device for delivering centered portions of casings to the stripping machine 10, as hereinafter described.

Also journaled in and between the standards 14 is a shaft 25 and fixed to this shaft is a pulley 26. A conveyor belt 27 passes around the pulley 26 and the shaft 25 is appropriately driven by the shaft 15 through the medium of a sprocket and chain mechanism represented generally by the numeral 28. The belt 27 passes beneath the roll 16 and it is in general alignment with the belt 23. The belt 27 also passes around an idler pulley 29 that is appropriately supported on the first crushing machine 11.

This first crushing machine comprises a smooth roll 30 whose shaft 31 is appropriately journaled in the frame of the crusher and which is driven by a motor 32 through a suitable sprocket-chain arrangement designated by the numeral 33. Located above the smooth roll 30 and adjacent the delivery side of the pulley 29 is a draw roll 34 and at a lower elevation and in working relation to the roll 30 is a crushing roll 35, the rolls 34 and 35 being suitably journaled in the frame of the crusher. Meshing spur gears 36, 37 and 38 mounted on the shaft 31 and the shafts of the rolls 34 and 35, respectively, provide for the necessary drive of the rolls 34 and 35 which are rotated in the clockwise direction designated by the arrows in Fig. 2, the smooth roll 30 operating in a counterclockwise direction. The rolls 30 and 34 operate as feeding rolls to deliver the centered portions of castings received from the conveyor belt 27 into the crushing zone between the rolls 30 and 35. A spray pipe 64 is also mounted on the crusher with its delivery end located to discharge jets of water between the rolls 30 and 34 and so drive or force the centered portions of the casings into a position to be gripped by the draw rolls. As is usual with machines of this character, the surface of the roll 34 is fluted or corrugated lengthwise of the roll, as designated by the numeral 39 in Fig. 2, while the periphery of the crushing roll 35 is provided with a plurality of longitudinally extending teeth 40, the teeth being arranged in a manner generally similar to the teeth of a ratchet wheel and each tooth applying a crushing pressure to the casing portions passed therebetween and the roll 30.

A shaft 41 is also journaled in the frame of the crusher 11 and fastened to this shaft is a pulley 42. Driving connection between the shafts 31 and 41 is established by a sprocket-chain mechanism designated by the numeral 43. A conveyor belt 44 operates over the pulley 42 and is located in general alignment with the conveyor belt 27, and is utilized to receive the center portions of crushed casings delivered by the first crushing machine 11. The belt 44 also passes around an idler pulley 45 which is suitably supported on the frame of the second crushing machine 12.

This second crushing machine is provided with a group of cooperating rolls, including a smooth surface roll, a draw roll, and a crushing roll, each of which is mounted and related to the other rolls in the group in a manner identical with that illustrated and described for the first crusher. This group of rolls in the second crushing unit is designated generally by the numeral 46 and the drive for this group of rolls is established by a motor 47 which has appropriate sprocket-chain connection with the smooth roll of the group in the manner hereinbefore described. A spray pipe (not shown in Fig. 1) similar to the pipe 64 is also carried by the second crusher and performs a similar service.

A shaft 48 is journaled in the frame of the second crushing machine 12 and is drivably connected to the shaft of the smooth roll of the roll group 46 through a sprocket-chain mechanism 50. A conveyor belt 51 operates over the pulley 49 and is so disposed as to receive the center portions of casings delivered from the second crushing machine. This belt is also in alignment with the conveyor belt 44.

The belt 51 also passes around a squeezing roll 52 that is attached to a shaft 53 journaled in the standards of the second stripping machine 13 which, so far as the support of the squeezing rolls is concerned is identical with the first stripping machine 10. For reasons noted in connection with the first stripper, the belt 51 is preferably seated in an annular channel or recess provided in the surface of the roll 52. The shaft 53 projects beyond one of the standards of the machine 13 (see Fig. 3) and has affixed thereto a spur gear 54 which meshes with a spur gear 55 that is mounted on a shaft 56, also journaled in the stripper 13. A cooperating squeezing roll 57 is secured to the shaft 56 and operating in an annular channel in the surface of the roll 57 is a belt 58 that also passes around an idler pulley 59 suitably supported upon a pair of brackets 60 that are carried by a water tank 61 located between the second crusher and the second stripper. A similar water tank 62 is positioned between the first stripping machine and the second crushing machine and underlies the first crushing machine. The pulley 59 is located so as to provide cooperating portions of the belts 51 and 58 in order to satisfactorily grip the centered portions of casings and deliver them to and between the squeezing rolls of the second stripping machine, as hereinafter described.

In treating casings according to my improved method, the operator first centers a casing and places this centered portion on the belt 23 which conveys the indicated portion into and between the squeezing rolls of the first stripper which removes from the casing those mucus, fat and slime elements that can be easily eliminated by a simple squeezing operation.

The centered portion of the casing in question is then delivered onto the belt 27, it being understood that this belt then conveys the centered portion toward the second crusher with the trailing strands of the casing dropping on opposite sides of the belt 27 and eventually into the water tank 62 where they are subjected to a temporary soaking action. The centered portion then drops between the pulley 29 and the draw roll 35, is deflected by a guide plate 63 (see Fig. 2) and is driven by the water jets issuing from the pipe 64 between the rolls 34 and 39, from which the centered portion passes between the squeezing roll 35 and the roll 30 where the mucus, fat and outer skin or slice are subjected to a crushing action that loosens these materials and conditions them for subsequent removal.

The centered portion of the casing in question is then delivered to the conveyor belt 44 and the trailing strands are again subjected to a soaking action in the tank 62. The belt 44 delivers the casing to the second crusher where the operation of the first crusher is repeated.

It has been ascertained that the introduction of this second crushing operation substantially applies a crushing pressure to those portions of the casing that were not exposed to the crushing action of the teeth 40 in the first crushing machine, so that the undesirable material in the casing which requires removal before the casing can be employed for meat stuffing purposes, is more thoroughly conditioned for the final squeezing and cleaning treatment. This situation applies particularly to the outer skin or slice which is comparatively tough. The introduction of this second crusher, moreover, substantially eliminates the necessity in a number of instances of repassing any particular casing through the crushing and stripping units as now arranged in the industry with a marked and obvious saving in the economical operation of the unit as a whole.

According to the practice now common in the industry, the casings are successively stripped or squeezed, crushed and then stripped again by manually feeding the casings to separate machines. With such an arrangement, and considering hog casings, a good working average is about 42.5 feet of No. 1 casing per hog, that is, an unbroken length of casing that has not been ruptured in the final cleaning operation. However, a single crushing treatment often fails to thoroughly crush the undesirable material and loosen the same, so that in the final cleaning operation the attempt to separate this substance from the casing results in a rupture thereof and the securement of short pieces of casing which command a lower market price.

According to my continuous method, this loss is entirely obviated and the use of the method has definitely indicated that a four to five foot increase in the length of No. 1 casing per hog can be expected, or in other words, an approximately 10 per cent increase over the expectancy of methods now in use.

The centered portions of casings delivered by the second crusher 12 are delivered to the belt 51, with their trailing strands deposited in the tank 61 and these centered portions eventually become subject to the frictional pull exerted by the cooperating portions of the belts 51 and 58, it being understood that the contact between the indicated belt portions is not so intensive, considered in conjunction with the natural sag of the upper portion of the belt 51, to prevent casings being drawn between the belt portions, or to exert a damaging pressure on the tender casings. This frictional pull on the center portions of each casing finally delivers the casings into and between the squeezing rolls of the second stripping machine 13 where the material loosened by the two crushing operations is squeezed therefrom and the casings are thereafter collected for final treatment in a cleaning machine (not shown) which removes the loosened outer skin or slice.

From the time when the casings are delivered between the rolls 16 and 18 until they are discharged from the stripper 13, the casings are substantially free from tensional pull, thus reducing the possibility of rupture.

I claim:

1. The continuous method of loosening and removing mucus, fat and the like from an animal casing comprising the steps of successively squeezing, first crushing, second crushing, and again squeezing the casing, the second crushing step substantially affecting those portions of the casing not treated by the first crushing step whereby substantially the full length of the casing is subjected to a crushing action and the casing being substantially free from tensional pull between successive steps.

2. The continuous method of loosening and removing mucus, fat and the like from an animal casing comprising the steps of successively squeezing, applying a toothed pressure to the casing throughout its length to thereby provide crushed and uncrushed portions, applying a second toother pressure to the casing throughout its length, the second pressure being substantially applied to the casing portions uncrushed by the first pressure, and again squeezing the crushed casing, the casing being substantially free from tensional pull between successive steps.

3. The continuous method of loosening and removing mucus, fat and the like from an animal casing comprising drawing the casing successively between squeezing, first crushing, second crushing and resqueezing rolls while supporting and carrying the casing between successive sets of rolls, the casing being presented to the second crushing rolls for crushing thereby substantially in locations not crushed by the first crushing rolls and the casing being substantially free from tensional pull between successive rolls.

4. The method of continuously loosening and removing mucus, fat and the like from a succession of animal casings comprising centering each casing and successively delivering the centered portions into operative relation to first squeezing rolls, first crushing rolls, second crushing rolls, and second squeezing rolls, the respective rolls thereafter acting to draw therebetween the trailing strands of the successive casings and the casings being substantially free from tensional pull between successive rolls.

5. The method of continuously loosening and removing mucus, fat and the like from a succession of animal casings comprising centering each casing and successively passing each casing between first squeezing, first crushing, second crushing and second squeezing rolls while maintaining the centering of each casing and transporting the same between successive sets of rolls without exerting any substantial tensional pull thereon.

6. The method of continuously removing mucus, fat and the like from animal casings comprising delivering each casing in succession to first squeezing rolls, first crushing rolls, second crushing rolls and second squeezing rolls, each casing being free from any substantial tensional pull during the deliveries.

HENRY J. WOLLWEBER.